United States Patent [19]

O'Donnell et al.

[11] Patent Number: 5,516,185
[45] Date of Patent: May 14, 1996

[54] CAB TO CAP GAP FILLER APPARATUS

[76] Inventors: Teresa H. O'Donnell; Patrick A. O'Donnell, both of 12 Morningside Dr., Billerica, Mass. 01821-1448

[21] Appl. No.: 357,591

[22] Filed: Dec. 16, 1994

[51] Int. Cl.⁶ .................................................... B60P 3/32
[52] U.S. Cl. ........................ 296/166; 280/153.5; 277/189
[58] Field of Search .................................. 296/166, 206; 277/84, 166, 179, 189; 52/393; 49/483.1, 495.1, 500.1, 406; 280/153.5

[56] References Cited

U.S. PATENT DOCUMENTS

| | | | |
|---|---|---|---|
| Re. 13,945 | 7/1915 | McCormick | 280/153.5 |
| D. 251,724 | 5/1979 | Karpowicz | D12/155 |
| 1,869,039 | 7/1932 | Barr | 280/153.5 X |
| 1,893,399 | 1/1933 | Clark | 280/153.5 |
| 3,286,425 | 11/1966 | Brown | 49/495.1 X |
| 3,292,330 | 12/1966 | Tennison | 49/495.1 X |
| 3,837,700 | 9/1974 | Van Slyke | 296/166 |
| 3,897,100 | 7/1975 | Gardner | 296/10 |
| 3,897,970 | 8/1975 | Gattenby | 296/166 |
| 4,114,943 | 9/1978 | Engelhard | 296/156 |
| 4,222,605 | 9/1980 | Engelhard | 296/166 |
| 4,294,485 | 10/1981 | Engelhard | 296/166 |
| 4,627,655 | 12/1986 | Collins | 296/166 X |
| 4,973,098 | 11/1990 | McFall | 296/65.1 |
| 5,090,765 | 2/1992 | Gremillion | 296/180.1 |

FOREIGN PATENT DOCUMENTS

| | | | |
|---|---|---|---|
| 1277042 | 9/1968 | Germany | 49/500.1 |
| 199396 | 11/1965 | Sweden | 49/495.1 |

*Primary Examiner*—Dennis H. Pedder

[57] ABSTRACT

A cab to cap gap filler apparatus includes a top assembly which includes a top width that is greater than a gap width of a gap between a rear of a truck cab and a front of a truck bed cap. The top assembly is flexible along lines which are parallel to the top width, and the top assembly has a top length which is sufficiently long for the top assembly to cover horizontal and vertical portions of the gap between the rear of the cab and the front of the truck bed cap when the top assembly is flexed around horizontal and vertical portions of the gap. A flexible housing assembly is connected to a bottom side of the top assembly and includes a portion which has a housing width which is less than the top width, and a quantity of moldable solid particulate material is contained within the flexible housing assembly. The moldable solid particulate material is adapted to be squeezed between the gap between the rear of the cab and the front of the truck bed cap when the top assembly is placed over the gap and pressure is applied to a top side of the top assembly. End assemblies are connected to ends of the top assembly. The end assemblies and/or top assembly include pockets which contain magnets. The pockets includes hook and loop closures.

6 Claims, 3 Drawing Sheets

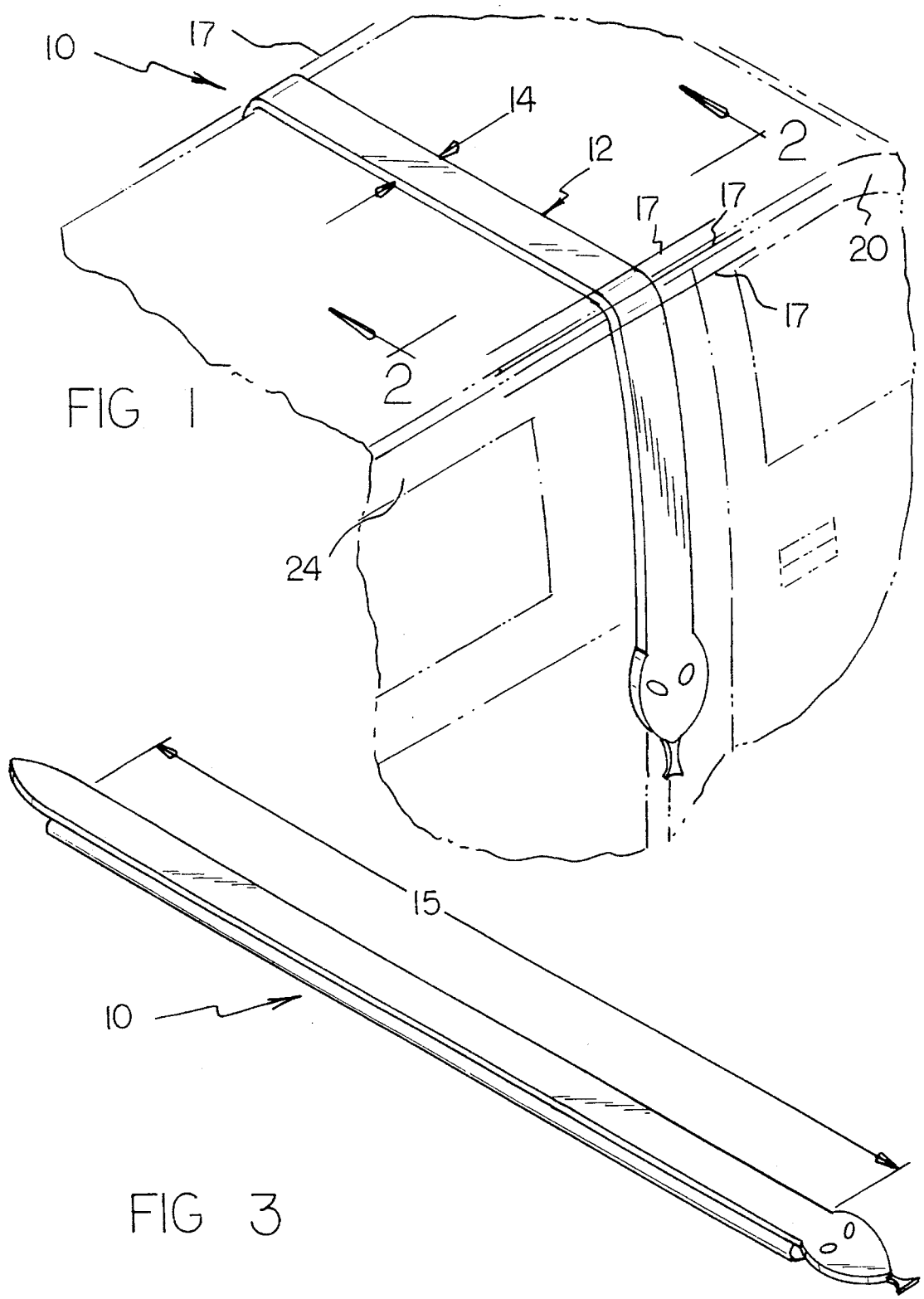

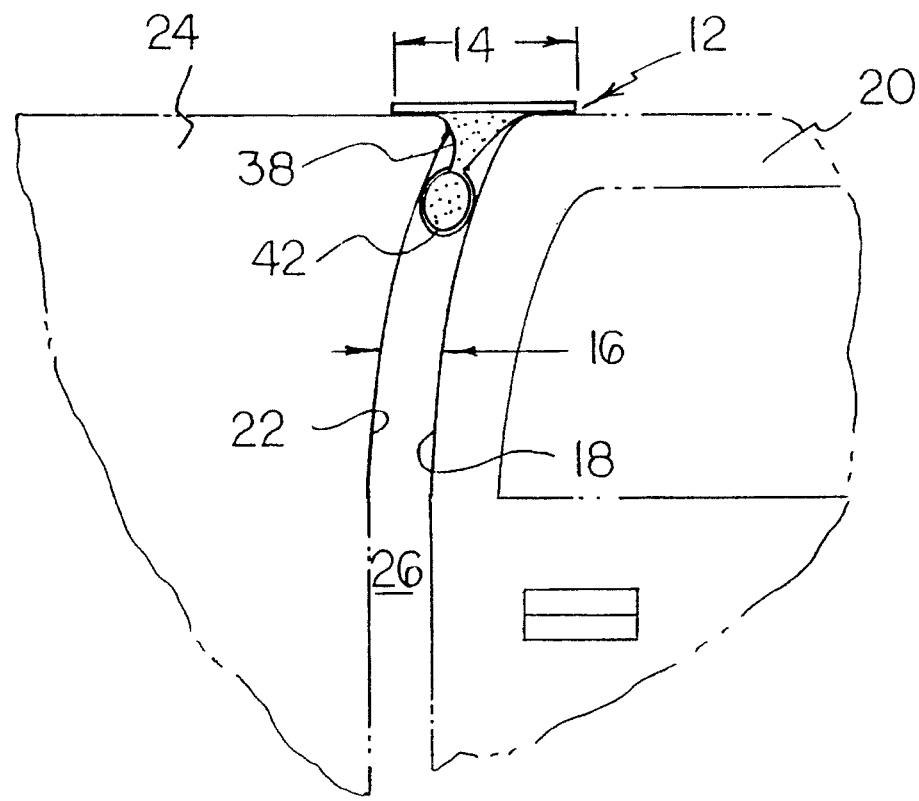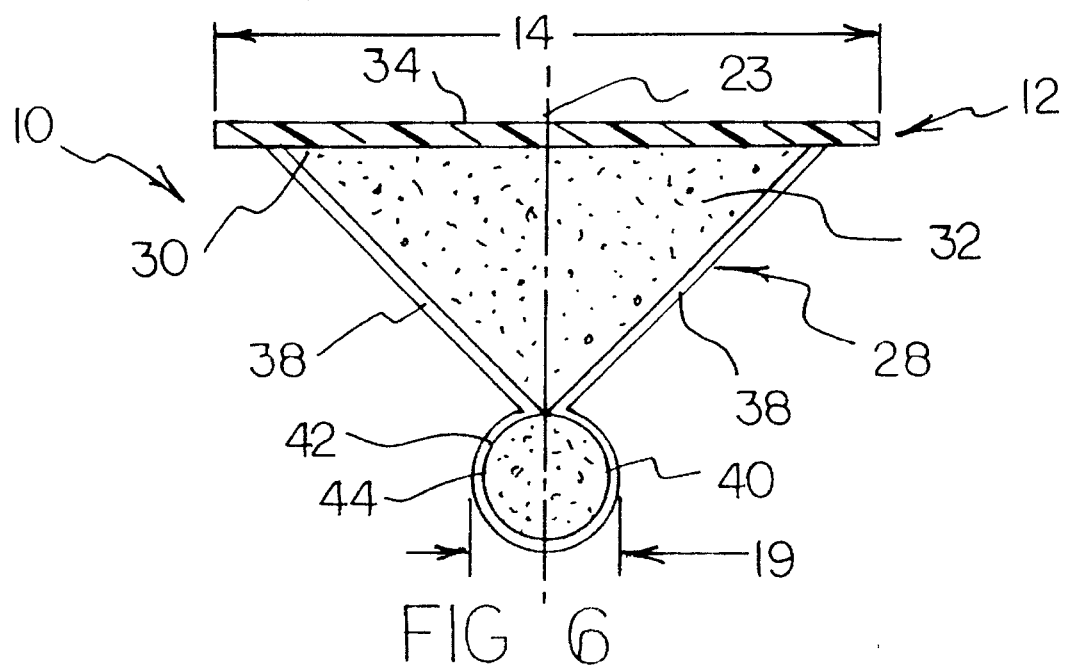

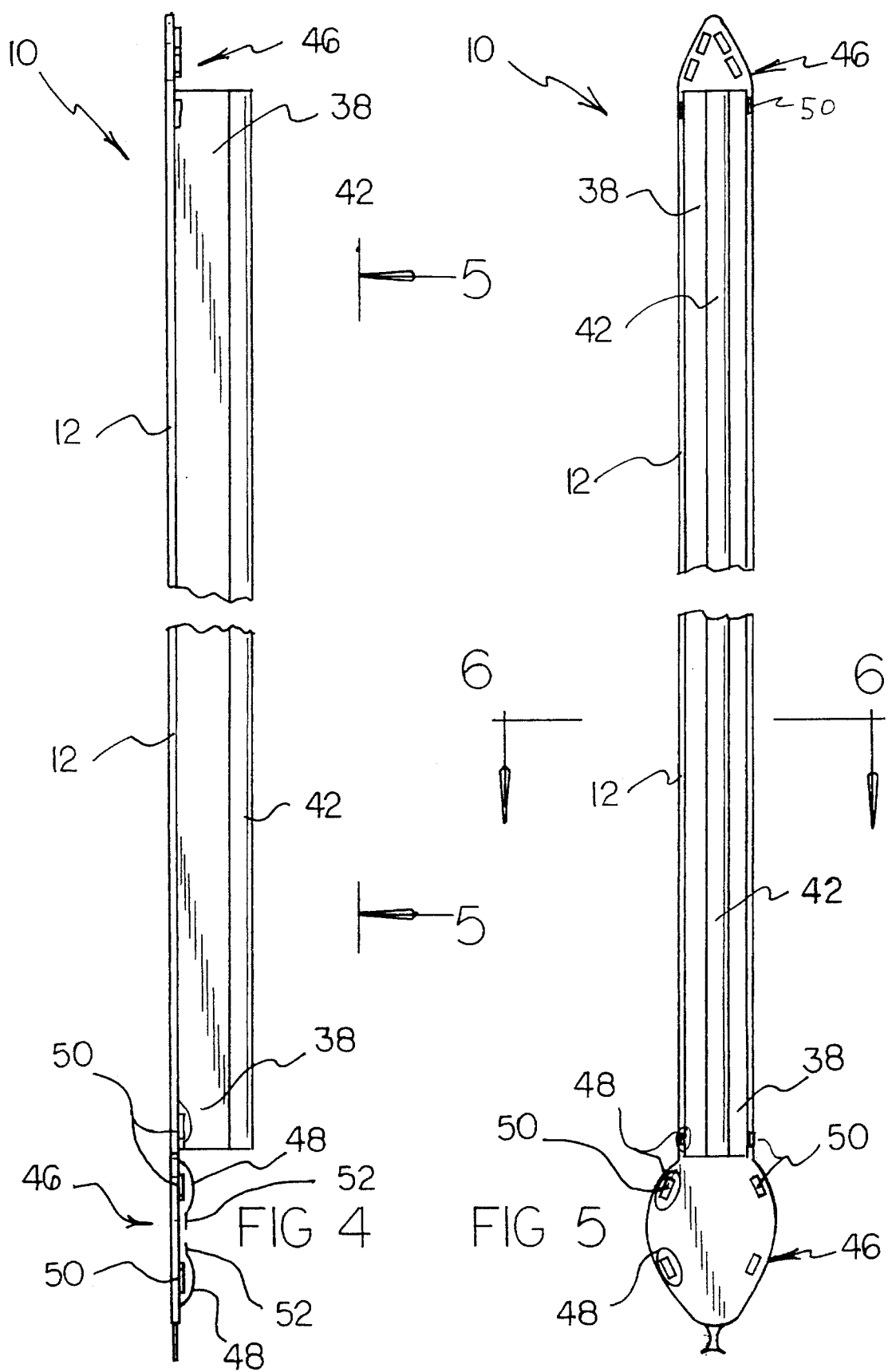

CAB TO CAP GAP FILLER APPARATUS

BACKGROUND OF THE INVENTION

1. Field of the Invention

The present invention relates generally to devices used with pickup trucks that include a camper type cap over the truck bed and, more particularly, to devices especially adapted for providing a seal between a truck cab and the truck bed cap.

2. Description of the Prior Art

Pickup trucks with caps over the truck bed have a gap between the truck cab and the truck bed cap. In winter, snow, sleet, and ice can fall into this gap and build up, obscuring the driver's rear view. This buildup can also freeze shut the rear window of the cab on cabs that have rear cap windows that are adapted to be opened. Also, during the spring and fall, dew settles on both rear window of the cab and the front window of the cap resulting in obscured vision. To avoid snow and ice from entering the gap between the rear of the cab and the front of the truck bed cap, it would be desirable if an apparatus were provided that filled the gap between the rear of the cab and the front of the truck bed cap.

The gap between the rear of the cab and the front of the truck bed cap is especially small on sporty pickup trucks with molded, snugly fitting fiberglass caps. On these types of trucks, it is difficult or impossible to fit a snowbrush, squeegee, or other narrow object into the gap to remove snow buildup or wipe down the windows. Currently, the only solutions for snow buildup are jamming a rigid object into the gap and attempting to break up and remove snow chunks, or waiting until warmer weather melts the snow jam. Use of a rigid object to clear the gap can scratch and abrade the fiberglass cap and truck paint. In this respect, it would be desirable if a filler apparatus were provided for the gap between the rear of the cab and the front of the truck bed cap that precludes the need to use rigid objects for clearing away snow and ice from the gap.

With such a narrow gap as described above, one way to remove dew from the rear window of the cab and the front window of the cap is to slide open the cab or cap window and clear off the dew by hand. This is a time-consuming and work intensive process, and it would be desirable to avoid a window cleaning operation that uses a person's hands as the cleaning implements. Another way to remove dew from the rear cab window and front cap window is to drive the vehicle until air flow through the gap evaporates the moisture. Such a technique may not be effective when ambient relative humidity is very high. With either method described above for removing dew from the windows adjacent to the gap between the rear of the cab and the front of the truck bed cap, the driver's visibility is impaired for often long periods of time. In this respect, it would be desirable if an apparatus were provided which prevented the build up of visibility-impairing dew on the windows adjacent to the gap between the rear of the cab and the front of the truck bed cap.

Throughout the years, a number of innovations have been developed relating to devices designed for filling the gap between the rear of the cab and the front of the truck bed cap, and the following U.S. patents are representative of some of those innovations: 3,837,700 and 3,897,970. More specifically, U.S. Pat. Nos. 3,837,700 and 3,897,970 disclose inflatable devices for filling the gap between the rear of the cab and the front of the truck bed cap. There are a number of disadvantages associated with the use of such inflatable gap filler devices. For example, they are readily subject to tiny punctures or cracks which allow pressurized air to escape, thereby precluding effectiveness of the device. In this respect, it would be desirable if a device were provided for filling the gap between the rear of the cab and the front of the truck bed cap which does not employ pressurized air that can leak if small cracks or punctures occur in the device.

Another disadvantage of the inflatable devices is their light weight. Being filled with only air and being so light weight, the force of gravity is not a major factor in keeping the devices in U.S. Pat. Nos. 3,837,700 and 3,897,970 firmly in place in the gap between the rear of the cab and the front of the truck bed cap. In this respect, it would be desirable if a device were provided for filling a gap between the rear of the cab and the front of the truck bed cap in which the force of gravity is a major factor in keeping the device firmly in place in the gap.

Still another disadvantage of an inflatable device is the time and effort required to inflate the device. In this respect, it would be desirable if a device were provided for filling a gap between the rear of the cab and the front of the truck bed cap which did not require time and effort to inflate.

In addition, the following U.S. patents disclose some additional innovations for filling gaps in automotive vehicles: 3,897,100; 4,114,943; 4,222,605; 4,294,485; 5,090,765; and Des. No. 251,724. Of special interest are U.S. Pat. Nos. 4,114,943, 4,222,605, and 4,294,485 which disclose window boots installed in the gap between the rear of the cab and the front of the truck bed cap. A number of problems are associated with such window boots. First, such window boots require that the shape of the rear window of the cab and the shape of the front window of the cap be substantially identical. In practical applications, however, such is not the case. In this respect, it would be desirable if a device were provided for filling a gap between the rear of the cab and the front of the truck bed cap which does not require that the shape of the rear window of the cab and the shape of the front window of the cap be substantially identical. A second problems associated with such window boots is the need to place the rear window of the cab and the front window of the cap in substantial registration with one another. Again, in practical applications, such a requirement may be difficult or impossible to fulfill. Therefore, it would be desirable if a device were provided for filling a gap between the rear of the cab and the front of the truck bed cap which does not require the rear window of the cab and the front window of the cap in to be in substantial registration with one another.

Still other features would be desirable in a cab to cap gap filler apparatus. Aside from taking advantage of the force of gravity for retaining a gap filler apparatus in proper position, it would also be advantageous to take advantage of ferromagnetic properties if both the cab of the truck and either the truck bed or the truck bed cap are made from ferromagnetic materials. That is, magnets can be employed to attach cab to cap gap filler apparatus when both the cab and the bed or cap include ferromagnetic materials.

Thus, while the foregoing body of prior art indicates it to be well known to use devices to cover the gap between the rear of the cab and the front of the truck bed cap, the prior art described above does not teach or suggest a cab to cap gap filler apparatus which has the following combination of desirable features: (1) fills the gap between the rear of the cab and the front of the truck bed cap; (2) precludes the need to use rigid objects for clearing away snow and ice from the gap; (3) avoids a window cleaning operation that uses a person's hands as the cleaning implements; (4) prevents the build up of visibility-impairing dew on the windows adjacent to the gap between the rear of the cab and the front of the truck bed cap; (5) does not employ pressurized air that can leak if small cracks or punctures occur in the device; (6) employs the force of gravity to be a major factor in keeping the device firmly in place in the gap; (7) does not require time and effort to inflate; (8) does not require that the shape of the rear window of the cab and the shape of the front window of the truck bed cap be substantially identical; (9) does not require the rear window of the cab and the front window of the cap in to be in substantial registration with one another; and (10) employs magnets can be employed to attach the cab to cap gap filler apparatus when both the cab and the bed or cap include ferromagnetic materials. The foregoing desired characteristics are provided by the unique cab to cap gap filler apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a cab to cap gap filler apparatus which includes a top assembly which has a top width and a top length. The top width is greater than a gap width of a gap between a rear of a truck cab and a front of a truck bed cap. The top assembly is flexible along lines which are parallel to the top width, and the top length is sufficiently long for the top assembly to cover horizontal and vertical portions of the gap between the rear of the cab and the front of the truck bed cap when the top assembly is flexed around horizontal and vertical portions of the gap. A flexible housing assembly is connected to a bottom side of the top assembly. The flexible housing assembly includes a portion which has a housing width which is less than the top width, and a quantity of moldable solid material is contained within the flexible housing assembly. The moldable solid material is adapted to be squeezed between the gap between the rear of the cab and the front of the truck bed cap when the top assembly is placed over the gap and pressure is applied to a top side of the top assembly. The moldable solid material is comprised of solid particulate material. The top assembly and the flexible housing assembly are made from water repellent material.

The flexible housing assembly may include a top compartment which includes top compartment walls connected directly to the bottom side of the top assembly. The top compartment contains a quantity of a first moldable solid material which has a first degree of hardness. A bottom compartment includes bottom compartment walls connected to the top compartment walls. The bottom compartment includes a quantity of a second moldable solid material which has a second degree of hardness. The second degree of hardness is greater than the first degree of hardness.

End assemblies are connected to ends of the top assembly. The end assemblies and/or top assembly include pockets which contain magnets. The pockets includes hook and loop closures.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cab to cap gap filler apparatus which has all of the advantages of the prior art and none of the disadvantages.

It is another object of the present invention to provide a new and improved cab to cap gap filler apparatus which may be easily and efficiently manufactured and marketed.

It is a further object of the present invention to provide a new and improved cab to cap gap filler apparatus which is of durable and reliable construction.

An even further object of the present invention is to provide a new and improved cab to cap gap filler apparatus which is susceptible of a low cost of manufacture with regard to both materials and labor, and which accordingly is then susceptible of low prices of sale to the consuming public, thereby making such cab to cap gap filler apparatus available to the buying public.

Still yet a further object of the present invention is to provide a new and improved cab to cap gap filler apparatus which fills the gap between the rear of the cab and the front of the truck bed cap.

Still another object of the present invention is to provide a new and improved cab to cap gap filler apparatus that precludes the need to use rigid objects for clearing away snow and ice from the gap.

Yet another object of the present invention is to provide a new and improved cab to cap gap filler apparatus which avoids a window cleaning operation that uses a person's hands as the cleaning implements.

Even another object of the present invention is to provide a new and improved cab to cap gap filler apparatus that prevents the build up of visibility-impairing dew on the windows adjacent to the gap between the rear of the cab and the front of the truck bed cap.

Still a further object of the present invention is to provide a new and improved cab to cap gap filler apparatus which does not employ pressurized air that can leak if small cracks or punctures occur in the device.

Yet another object of the present invention is to provide a new and improved cab to cap gap filler apparatus that employs the force of gravity to be a major factor in keeping the device firmly in place in the gap.

Still another object of the present invention is to provide a new and improved cab to cap gap filler apparatus which does not require time and effort to inflate.

Yet another object of the present invention is to provide a new and improved cab to cap gap filler apparatus that does not require that the shape of the rear window of the cab and the shape of the front window of the truck bed cap be substantially identical.

Still a further object of the present invention is to provide a new and improved cab to cap gap filler apparatus that does not require the rear window of the cab and the front window of the cap in to be in substantial registration with one another.

Yet another object of the present invention is to provide a new and improved cab to cap gap filler apparatus which employs magnets can be employed to attach the cab to cap gap filler apparatus when both the cab and the bed or cap include ferromagnetic materials.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the cab to cap gap filler apparatus of the invention in position for filling a gap between the rear of a cab and the front of a truck bed cap.

FIG. 2 is a cross-sectional view of the embodiment of the invention shown in FIG. 1 taken along line 2—2 of FIG. 1.

FIG. 3 is a perspective view of the embodiment of the cab to cap gap filler apparatus shown in FIG. 1 after it has been removed from the truck and placed on a flat surface.

FIG. 4 is an enlarged side view of the embodiment of the cab to cap gap filler apparatus of FIG. 3.

FIG. 5 is a top view of the embodiment of the invention shown in FIG. 4 taken along line 5—5 of FIG. 4.

FIG. 6 is a cross-sectional view of the embodiment of the invention shown in FIG. 5 taken along line 6—6 of FIG. 5.

DESCRIPTION OF THE PREFERRED EMBODIMENT

With reference to the drawings, a new and improved cab to cap gap filler apparatus embodying the principles and concepts of the present invention will be described.

Turning to FIGS. 1–6, there is shown an exemplary embodiment of the cab to cap gap filler apparatus of the invention generally designated by reference numeral 10. In its preferred form, cab to cap gap filler apparatus 10 includes planar top assembly 12 which includes a top width 14 and a top length 15. The flexible housing assembly 28 is oriented along an orientation plane 23 which is oriented perpendicular to the planar top assembly 12. The top width 14 is greater than a gap width 16 of a gap 26 between a rear 18 of a truck cab 20 and a front 22 of a truck bed cap 24. The top assembly 12 is flexible along lines 17 which are parallel to the top width 14, and the top length 15 is sufficiently long for the top assembly 12 to cover horizontal and vertical portions of the gap 26 between the rear 18 of the cab 20 and the front 22 of the truck bed cap 24 when the top assembly 12 is flexed around horizontal and vertical portions of the gap 26. A flexible housing assembly 28 is connected to a bottom side 30 of the top assembly 12. The flexible housing assembly 28 includes a portion which has a housing width 19 which is less than the top width 14, and a quantity of moldable solid material 32 is contained within the flexible housing assembly 28. The moldable solid material 32 is adapted to be squeezed between the gap 26 between the rear 18 of the cab 20 and the front 22 of the truck bed cap 24 when the top assembly 12 is placed over the gap 26 and pressure is applied to a top side 34 of the top assembly 12. The moldable solid material 32 is comprised of solid particulate material. The top assembly 12 and the flexible housing assembly 28 are made from water repellent material.

The flexible housing assembly 28 includes a top compartment 36 which includes top compartment walls 38 connected directly to the bottom side 30 of the top assembly 12. The top compartment 36 contains a quantity of a first moldable solid material 32 which has a first degree of hardness, and a bottom compartment 40 includes bottom compartment walls 42 connected to the top compartment walls 38. The bottom compartment 40 includes a quantity of a second moldable solid material 44 which has a second degree of hardness. The second degree of hardness is greater than the first degree of hardness.

More specifically, the top compartment 36 is a triangular wedge of loosely filled polyfill which fills the widest top-section of the gap 26 and supports the top assembly 12 located above it. The bottom compartment 40 is a harder, more firmly-packed polyfill tube which fits more deeply and snugly into the gap 26 and helps secure the cab to cap gap filler apparatus 10 in place. End assemblies 46 are connected to ends of the top assembly 12. The end assemblies 46 and/or top assembly 12 include pockets 48 which contain magnets 50. The pockets 48 includes hook and loop closures 52. The hook and loop closures 52 can be made from Velcro(TM) material. When the cab to cap gap filler apparatus 10 of the invention is to be washed in a washing machine, the pockets 48 are opened, and the magnets 50 are removed. After washing and drying takes place, the magnets 50 are placed back in the pockets 48, and the hook and loop closures 52 are refastened to retain the magnets 50 in the pockets 48.

A matching draw-string bag can be used for carrying and stowing the cab to cap gap filler apparatus 10 when not in use. The bag fits easily behind the back seat in the truck cab 20. When the cab to cap gap filler apparatus 10 of the invention is in use, the drawstring of the storage bag can be slipped over the vehicle steering wheel to remind the driver to remove and stow the cab to cap gap filler apparatus 10 prior to driving.

In implementing a specific embodiment of the cab to cap gap filler apparatus 10 of the invention shown in the drawings, the cab to cap gap filler apparatus 10 is a long tubular device constructed out of sports nylon and polyfill. The sport nylon is used for the top assembly 12, the end assemblies 46, and the flexible housing assembly 28. The polyfill is used for the first moldable solid material 32 and the second moldable solid material 44. A particular embodiment was constructed to fit a Toyota pickup truck with a Century fiberglass cap. This combination results in a gap 26 between the rear 18 of the cab 20 and the front 22 of the truck bed cap 24. The housing assembly has a triangular cross-section which ranges from approximately 3 inches at the top to 1 inch further down. The top assembly 12 of the cab to cap gap filler apparatus 10 consists of a 4 to 5 inch wide flat piece of nylon which completely covers the top of the gap 26. The flexible housing assembly 28 contains a quantity of the moldable solid particulate material 32 which squishes into the gap 26 and fills the first 2 to 3 inches of the gap 26. The top length 15 is approximately 88 to 90 inches. The cab to cap gap filler apparatus 10 installs symmetrically and extends vertically from the metal truck bed just beneath the cap, horizontally over the gap 26, and vertically down the other side. The cab to cap gap filler apparatus 10 bends at lines 17 as it covers both vertical and horizontal portions of the gap 26.

The cab to cap gap filler apparatus 10 of the invention is easy to install and remove, snug fitting, weather resistant, attractive, small, portable, and easy to clean. The cab to cap gap filler apparatus 10 of the invention will not freeze onto the truck, and it is easily removable even after ice storms. When installed, the cab to cap gap filler apparatus 10 fits snugly and will not blow off, even in high winds. The magnets 50 of the end assemblies 46 and/or top assembly 12 help assure a secure fit to the truck cab 20 and the truck bed cap 24. The cab to cap gap filler apparatus 10 fits so that snow is unlikely to fall into the gap 26 between the rear 18 of the cab 20 and the front 22 of the truck bed cap 24, either during snowfall, or while the truck is cleaned off after a snow storm.

It is noted that while a snug fit is desired for the cab to cap gap filler apparatus 10, the apparatus 10 is not intended to be used when the vehicle is operated. The apparatus must be removed from the vehicle before the vehicle is driven so that apparatus will not fall off of the vehicle onto the road and so that it will not block clean air flow through the gap 26 between the rear 18 of the cab 20 and the front 22 of the truck bed cap 24 causing exhaust gases to enter the truck cab 20.

It is noted that the end assemblies 46 can have artistic designs to give an overall character to the cab to cap gap filler apparatus 10 of the invention. For example, as shown in the drawings, one of the end assemblies 46 resembles the head of a snake. The other of the end assemblies 46 resembles the tail of a snake. Of course, the top assembly 12 resembles the body of a snake. Other artistic designs may include a head end assembly 46 representing a head and front legs of a dog and may include a tail end assembly 46 representing a rear end and rear legs of a dog. Alternatively, each of the end assemblies 46 can resemble an ear muff. Other artistic designs may also be employed.

Sports nylon and polyfill are both well known in the art and are both machine washable and dryer safe, on lowest setting. The nylon, which is the same type used for outdoor flags, is weather and mildew resistant and can be treated to be water repellent. Although the first moldable solid material 32 and the second moldable solid material 44 may be the particulate material polyfill mentioned above, other particulate solid materials can be employed such as beanbag pellets.

Moreover, instead of employing a flexible housing assembly 28 which includes a top compartment 36 and a bottom compartment 40, it is contemplated that a single compartment flexible housing assembly 28 can be employed. A flexible housing assembly 28 that has a single, wedge-shaped compartment that is filled with beanbag pellets could easily be molded to conform to the tapered shape of the gap 26. Furthermore, it is contemplated that the moldable solid material 32 can be in the form of a single piece of tapered heavy-duty weather resistant foam which squishes into the gap 26. The foam could act as a stand-alone piece or be used as the underbelly of a top assembly 12.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved cab to cap gap filler apparatus that is low in cost, relatively simple in design and operation, and which may advantageously be used to fill the gap between the rear of the cab and the front of the truck bed cap. With the invention, a cab to cap gap filler apparatus is provided which precludes the need to use rigid objects for clearing away snow and ice from the gap. With the invention, a cab to cap gap filler apparatus is provided which avoids a window cleaning operation that uses a person's hands as the cleaning implements.

In addition, with the invention, a cab to cap gap filler apparatus is provided which prevents the build up of visibility-impairing dew on the windows adjacent to the gap between the rear of the cab and the front of the truck bed cap. With the invention, a cab to cap gap filler apparatus is provided which does not employ pressurized air that can leak if small cracks or punctures occur in the device. With the invention, a cab to cap gap filler apparatus is provided which employs the force of gravity to be a major factor in keeping the device firmly in place in the gap. With the invention, a cab to cap gap filler apparatus is provided which does not require time and effort to inflate. With the invention, a cab to cap gap filler apparatus is provided which does not require that the shape of the rear window of the cab and the shape of the front window of the truck bed cap be substantially identical. With the invention, a cab to cap gap filler apparatus is provided which does not require the rear window of the cab and the front window of the cap in to be in substantial registration with one another. With the invention, a cab to cap gap filler apparatus is provided which employs magnets can be employed to attach the cab to cap gap filler apparatus when both the cab and the bed or cap include ferromagnetic materials.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by LETTERS PATENT of the United States is as follows:

1. A cab to cap gap filler apparatus, comprising:

a planar top assembly which includes a top width and a top length, wherein said top width is greater than a gap width of a gap between a rear of a truck cab and a front of a truck bed cap, wherein said top assembly is flexible along lines which are parallel to said top width, and wherein said top length is sufficiently long for said top assembly to cover horizontal and vertical portions of the gap between the rear of the cab and the front of the truck bed cap when said top assembly is flexed around horizontal and vertical portions of the gap, a flexible housing assembly, connected to a bottom side of said top assembly, wherein said flexible housing assembly includes a portion which has a housing width which is less than the top width, wherein said flexible housing assembly is oriented along an orientation plane which is perpendicular to said planar top assembly, and a quantity of moldable solid material contained within said flexible housing assembly, wherein said moldable solid material is adapted to be squeezed between the gap between the rear of the cab and the front of the truck bed cap when said top assembly is placed over the gap and pressure is applied to a top side of said top assembly.

2. The apparatus of claim 1 wherein said moldable solid material is comprised of solid particulate material.

3. The apparatus of claim 1 wherein said top assembly and said flexible housing assembly are made from water repellent material.

4. A cab to cap gap filler apparatus, comprising:

a planar top assembly which includes a top width and a top length, wherein said top width is greater than a gap width of a gap between a rear of a truck cab and a front of a truck bed cap, wherein said top assembly is flexible along lines which are parallel to said top width, and wherein said top length is sufficiently long for said top assembly to cover horizontal and vertical portions of the gap between the rear of the cab and the front of the truck bed cap when said top assembly is flexed around horizontal and vertical portions of the gap, a flexible housing assembly, connected to a bottom side of said top assembly, wherein said flexible housing assembly includes a portion which has a housing width which is less than the top width, wherein said flexible housing assembly is oriented along an orientation plane which is perpendicular to said planar top assembly, and a quantity of moldable solid material contained within said flexible housing assembly, wherein said moldable solid material is adapted to be squeezed between the gap between the rear of the cab and the front of the truck bed cap when said top assembly is placed over the gap and pressure is applied to a top side of said top assembly, wherein said flexible housing assembly includes a top compartment which includes top compartment walls connected directly to said bottom side of said top assembly, wherein said top compartment contains a quantity of a first moldable solid material having a first degree of hardness, and wherein said flexible housing assembly further includes a bottom compartment which includes bottom compartment walls connected to said top compartment walls, wherein said bottom compartment includes a quantity of a second moldable solid material having a second degree of hardness, wherein said second degree of hardness is greater than said first degree of hardness.

5. The apparatus of claim 1, further including:

end assemblies connected to ends of said top assembly, wherein said end assemblies include pockets which contain magnets.

6. The apparatus of claim 5 wherein said pockets include hook and loop closures.

* * * * *